US009035182B2

(12) United States Patent
Scanzillo et al.

(10) Patent No.: US 9,035,182 B2
(45) Date of Patent: May 19, 2015

(54) FLOOR BOX COVER ASSEMBLY

(71) Applicant: Hubbell Incorporated, Shelton, CT (US)

(72) Inventors: Thomas L. Scanzillo, Monroe, CT (US); Michael J. Marchetti, Bridgeport, CT (US); Christopher A. Carbone, Newtown, CT (US); Ryan G. Papageorge, Shelton, CT (US)

(73) Assignee: HUBBELL INCORPORATED, Shelton, CT (US)

( * ) Notice: Subject to any disclaimer, the term of this patent is extended or adjusted under 35 U.S.C. 154(b) by 106 days.

(21) Appl. No.: 13/833,866

(22) Filed: Mar. 15, 2013

(65) Prior Publication Data
US 2014/0262420 A1 Sep. 18, 2014

(51) Int. Cl.
*H02G 3/14* (2006.01)
*H02G 3/08* (2006.01)

(52) U.S. Cl.
CPC . *H02G 3/14* (2013.01); *H02G 3/081* (2013.01)

(58) Field of Classification Search
CPC ......... H02G 3/14; H02G 3/081; H02G 3/083; H01R 13/74; H01R 13/5213; H05K 5/03
USPC ............. 174/66, 67, 50, 53, 57, 58, 480, 481, 174/482, 484, 488; 220/3.2–3.9, 241, 242; 439/536; D13/156, 177
See application file for complete search history.

(56) References Cited

U.S. PATENT DOCUMENTS

| 2,186,903 | A |   | 1/1940 | Gleason |  |
|---|---|---|---|---|---|
| 4,228,317 | A |   | 10/1980 | Cziment |  |
| 4,483,355 | A |   | 11/1984 | Yuhara |  |
| 4,585,139 | A |   | 4/1986 | Bronson et al. |  |
| 4,684,017 | A |   | 8/1987 | Watanabe et al. |  |
| 4,721,476 | A |   | 1/1988 | Zeliff et al. |  |
| 4,828,299 | A |   | 5/1989 | Poe |  |
| 4,928,350 | A |   | 5/1990 | Morgan |  |
| 5,317,108 | A | * | 5/1994 | Prairie, Jr. | 174/67 |
| 5,389,740 | A | * | 2/1995 | Austin | 174/67 |
| 5,493,760 | A |   | 2/1996 | Takimoto |  |
| 5,535,437 | A |   | 7/1996 | Karl et al. |  |
| 5,686,701 | A |   | 11/1997 | Fukushima et al. |  |
| 6,109,669 | A |   | 8/2000 | Pinkow |  |

(Continued)

FOREIGN PATENT DOCUMENTS

GB        2241389        8/1991

OTHER PUBLICATIONS

International Search Report and Written Opinion, dated Jun. 10, 2014, for PCT/US2014/019581.

*Primary Examiner* — Angel R Estrada
(74) *Attorney, Agent, or Firm* — Roylance, Abrams, Berdo & Goodman, L.L.P.

(57) ABSTRACT

A cover assembly for a floor box includes a base with a central opening and a cover pivotally connected to the base by a hinge member. The hinge member has a hinge body with a first end pivotally connected to the base for pivoting with respect to the base and second end pivotally connected to the cover for pivoting with respect to the cover. A tab extends from the second end of the hinge body to contact a bottom surface of the cover to limit pivoting movement of the cover with respect to the hinge body. A slide surface is provided on the base that contacts an end of the cover during pivoting movement of the cover to prevent wear on a gasket with the opening of the base.

23 Claims, 9 Drawing Sheets

(56) References Cited

U.S. PATENT DOCUMENTS

| | | | |
|---|---|---|---|
| 6,121,549 A * | 9/2000 | Korhonen | 174/66 |
| 6,145,352 A | 11/2000 | Vickers et al. | |
| 6,265,662 B1 | 7/2001 | Riedy et al. | |
| 6,530,250 B1 | 3/2003 | Linares et al. | |
| 6,563,297 B1 | 5/2003 | Boswell et al. | |
| 6,564,428 B2 | 5/2003 | Richard et al. | |
| 6,583,359 B1 * | 6/2003 | Cabello-Colon | 174/66 |
| 6,588,624 B1 | 7/2003 | Connors et al. | |
| 6,669,041 B2 | 12/2003 | Almond | |
| 6,719,332 B2 | 4/2004 | Sekulovic | |
| 6,857,538 B2 | 2/2005 | Lin | |
| 6,866,442 B1 | 3/2005 | Petersen | |
| 7,083,205 B2 | 8/2006 | Hall | |
| 7,265,292 B2 * | 9/2007 | Greenfield | 174/67 |
| 7,301,100 B2 | 11/2007 | Drane et al. | |
| 7,459,632 B2 | 12/2008 | Bowman | |
| 7,579,549 B2 | 8/2009 | Jolly | |
| 7,635,110 B2 | 12/2009 | Galasso et al. | |
| 7,798,540 B1 | 9/2010 | Vitry et al. | |
| 7,851,703 B2 | 12/2010 | Drane | |
| 7,935,889 B1 * | 5/2011 | Cleghorn | 174/66 |
| 7,968,794 B1 * | 6/2011 | Baldwin | 174/67 |
| 8,119,912 B2 | 2/2012 | Thibault et al. | |
| 8,357,852 B2 * | 1/2013 | Drane | 174/66 |
| 8,598,456 B2 * | 12/2013 | Carbone et al. | 174/66 |
| 8,633,385 B2 * | 1/2014 | Korcz et al. | 174/67 |
| 2008/0053679 A1 | 3/2008 | Galasso et al. | |
| 2008/0054135 A1 | 3/2008 | Galasso et al. | |
| 2009/0159308 A1 | 6/2009 | Thibault et al. | |
| 2010/0072198 A1 | 3/2010 | Roemer et al. | |
| 2010/0206603 A1 | 8/2010 | Drane | |
| 2010/0236023 A1 | 9/2010 | Wang et al. | |
| 2010/0244464 A1 | 9/2010 | Rajagopal et al. | |
| 2010/0300745 A1 | 12/2010 | Boyle et al. | |
| 2011/0049152 A1 | 3/2011 | Raghunathan et al. | |

\* cited by examiner

FLOOR BOX COVER ASSEMBLY

FIELD OF THE INVENTION

The present invention is directed to a cover assembly having a base and a hinged cover that pivots about 180° between an open position and closed position. The invention is particularly directed to a cover assembly having a hinge assembly that permits the cover to lay flat on the floor in the open position.

BACKGROUND OF THE INVENTION

Electrical floor boxes are known in the art for covering electrical receptacle and other electrical devices when not in use. Often the floor box has a hinged cover that pivots from a closed position to an open position. Many floor boxes have a top surface that is raised from the floor creating a lip that interferes with the use of the box.

One example of prior a floor box is disclosed in U.S. Patent Publication No. 2010/0072198 to Roemer et al. This patent application discloses a floor mounting container for an electrical device where the cover can pivot 180° to lay flat in the open position. The hinge includes a hinge block having one end pivotally connected to the flange of the container and a second end pivotally connected to the cover.

U.S. Pat. No. 4,721,476 to Zeliff et al. discloses a floor box having a cover hinged to the box and a notch in the cover for receiving an egress door. U.S. Patent Publication No. 2008/0054135 to Galasso et al. discloses a recessed electrical outlet box having a hinged cover that can pivot 180°. The hinge of Galasso et al. is a four part hinge having two interconnected links between the frame and the cover.

U.S. Pat. No. 5,493,760 to Takimoto, and U.S. Pat. No. 4,928,350 to Morgan disclose biaxial hinge assemblies having a single link connecting two hinge portions together to allow the hinge to pivot 180° and lay flat on the frame.

U.S. Patent Publication No. 2008/0053679 to Galasso et al. also discloses a recessed outlet box having a cover that can pivot 180°. As shown in FIG. 12, the hinge has two interconnecting links connected to the hinge member on the lid and the hinge member on the frame.

U.S. Pat. No. 7,301,100 to Drane et al. discloses a floor box cover that is hinged to the flange. As shown in FIG. 12, the cover can pivot 180° to lay flat against the floor. The hinge includes a pin made of a resilient material such as steel. When the cover is opened, the pin flexes to permit translational movement of the cover and pin and creates a biasing force to urge the cover in a forward position.

GB 2 241 389 discloses a floor box having a hinged cover where the hinge has two interconnecting links to allow the cover to lay flat when in the open position.

U.S. Pat. No. 7,579,549 to Jolly discloses a floor box having a cover that can pivot open and then retract into a slot in the face of the box.

U.S. Pat. No. 7,851,703 to Drane discloses a gasket forming a sealing member around the opening of a door. The gasket has a water-resistant coating to provide a releasable and repositionable adhesive sealing surface prior to curing.

U.S. Pat. No. 7,459,632 to Bowman discloses a floor box having a hinged cover with a hinged egress door. The egress door has a sealing member on one side to form a seal between the egress door and the lid.

U.S. Pat. No. 6,669,041 to Almond Inc. discloses a floor box having a hinged cover and an egress door. The cover does not pivot 180° with respect to the frame.

U.S. Pat. No. 6,265,662 to Riedy et al. discloses a floor box with a hinged cover and an egress door. The frame of the floor box includes a gasket for forming a seal. The cover includes a spring and a cam surface to secure the door in the closed position.

U.S. Patent Publication No. 2010/0236023 to Wang et al. discloses a hinge assembly for an electronic device such as a notebook computer. The hinge device includes a series of washers mounted on a pivot pin to provide sufficient friction to hold the hinge in the selected position.

U.S. Patent Publication No. 2010/0206603 to Drane discloses a latching floor box cover having a lid pivotally connected to the frame, a latch on the frame, and a lid biasing device positioned between the lid and the frame where the biasing device is in engagement with the frame to urge the lid away from the closed position when the lid is unlatched.

U.S. Pat. No. 4,483,355 to Yuhara discloses a vanity case having a sliding latch mechanism in the housing and a hinged cover that is opened by a spring as shown in FIG. 3.

While these devices have been generally suitable for the intended purpose there is continuing need in the industry for improved cover assemblies for floor boxes and hinge assemblies.

SUMMARY OF THE INVENTION

The present invention is directed to a floor box cover assembly where the cover pivots 180° between a closed position and an open position. The invention is particularly directed to cover assembly where the cover can pivot to an open position and lay flat on the floor surface without interference from the base of the cover assembly on the floor surface.

Accordingly one object of the invention is to provide a cover assembly for a floor box having a hinge assembly that enables the pivoting of the cover between a closed position where the cover is flush with the top surface of the base and an open position where the cover can lay flat on the floor.

Another feature of the invention is to provide a cover assembly having a hinge assembly with a hinge body that is pivotally connected to the base and pivotally connected to the cover. The hinge assembly enables a free range of movement of the cover with respect to the base.

A further feature of the invention is to provide a cover assembly for a floor box having a base and hinged cover. The base has a surface that contacts an edge of the cover during opening and closing of the cover to form a sliding surface to prevent excess wear to a gasket provided between the cover and the base. The gasket is positioned within a central opening of the base to form a seal between the cover and the base. The sliding surface is provided to contact the pivoting end of the cover during opening and closing to prevent sliding contact of the cover with the gasket and to guide the end of the cover to the closed position.

Another feature of the invention is to provide a cover assembly for a floor box where the cover is received in an opening in the base with the top surface of the cover flush with a top surface of the base when the cover is in the closed position. The cover is able to pivot to the open position with the top surface of the cover contacting a portion of the top surface of the base.

The cover assembly of the invention includes a hinge assembly that enables the cover to pivot to lay flat on the floor in the open position. The hinge assembly has a hinge body with one end pivotally coupled to a first end of the base and a second end pivotally coupled to a first end of the cover. The second end of the hinge body has a tab that extends from the hinge body to contact the bottom surface of the cover to limit pivoting movement of the cover with respect to the hinge body. The tab enables the hinge body to pivot with the cover about the pivot axis between the base and the hinge body while closing the cover.

The cover assembly includes a base with a central opening and a flange extending into the central opening. A gasket is provided on the top face of the flange to form a seal between the cover and the base. A slide member extends upward from the face of the flange to form a slide surface at the top face of the gasket so that the end edge of the cover slides on the slide member to prevent sliding contact with the gasket.

Another feature of the invention is to provide a cover assembly having a base and a hinged cover where the cover has a sliding latch assembly to latch the cover in the closed position. The latch assembly has an actuating member that is received in a recess in the cover so that the sliding latch body and the actuating member are flush with respect to the cover and the base.

Another feature of the invention is to provide a cover assembly with a sliding latch assembly having a latch body coupled to the cover for sliding movement between a closed position and an open position. The latch body has two outwardly extending arms extending from opposite sides of the latch body. An actuating member is pivotally coupled to the cover and has a pair of detents that engage the arms on the latch body to slide the latch body to the open position.

These and other aspects of the invention are basically attained by providing a cover assembly for a floor box where the cover assembly includes a base, a cover and a hinge assembly. The base defines a central opening for accessing the floor box. The cover has a dimension to close the central opening of the base. The hinge has a hinge body with a first end pivotally coupled to the base about a first pivot axis and a second end pivotally coupled to the cover about a second pivot axis. A tab extends from the second end of the hinge body to contact a bottom surface of the cover to limit pivoting of the cover with respect to the hinge body about the second pivot axis during closing of the cover.

The features of the invention are also attained by providing a cover assembly for a floor box including a base defining a central opening for accessing the floor box where the base has a first end and a second end. At least one slide surface is provided in the opening at the first end of the base. A cover is included having a dimension to close the central opening and contact the slide surface during opening and closing of the cover with respect to the base. A hinge has a hinge body for pivotally coupling the cover to the base. The hinge body has a first end pivotally coupled to the base at the first pivot axis and a second end pivotally coupled to the cover at the second pivot axis.

The various objects of the invention are also attained by providing a cover assembly for a floor box including a base, a cover and a hinge. The base defines a central opening for accessing the floor box and has a flange spaced from a top face of the base and extends into the central opening. The cover has a dimension to close the central opening and to mate with the flange. The hinge has a hinge body coupled to the cover and the base to pivot the cover with respect to the base between an open and closed position. The cover is substantially parallel to the base in the open position and is received in the central opening in the closed position.

These and other aspects, object and advantages of the invention will become apparent from the following detailed description of the invention which in conjunction with the annexed drawings disclose various embodiments of the invention.

BRIEF DESCRIPTION OF THE DRAWINGS

The following is a brief description of the drawings in which.

DETAILED DESCRIPTION OF THE INVENTION

Figure 1:
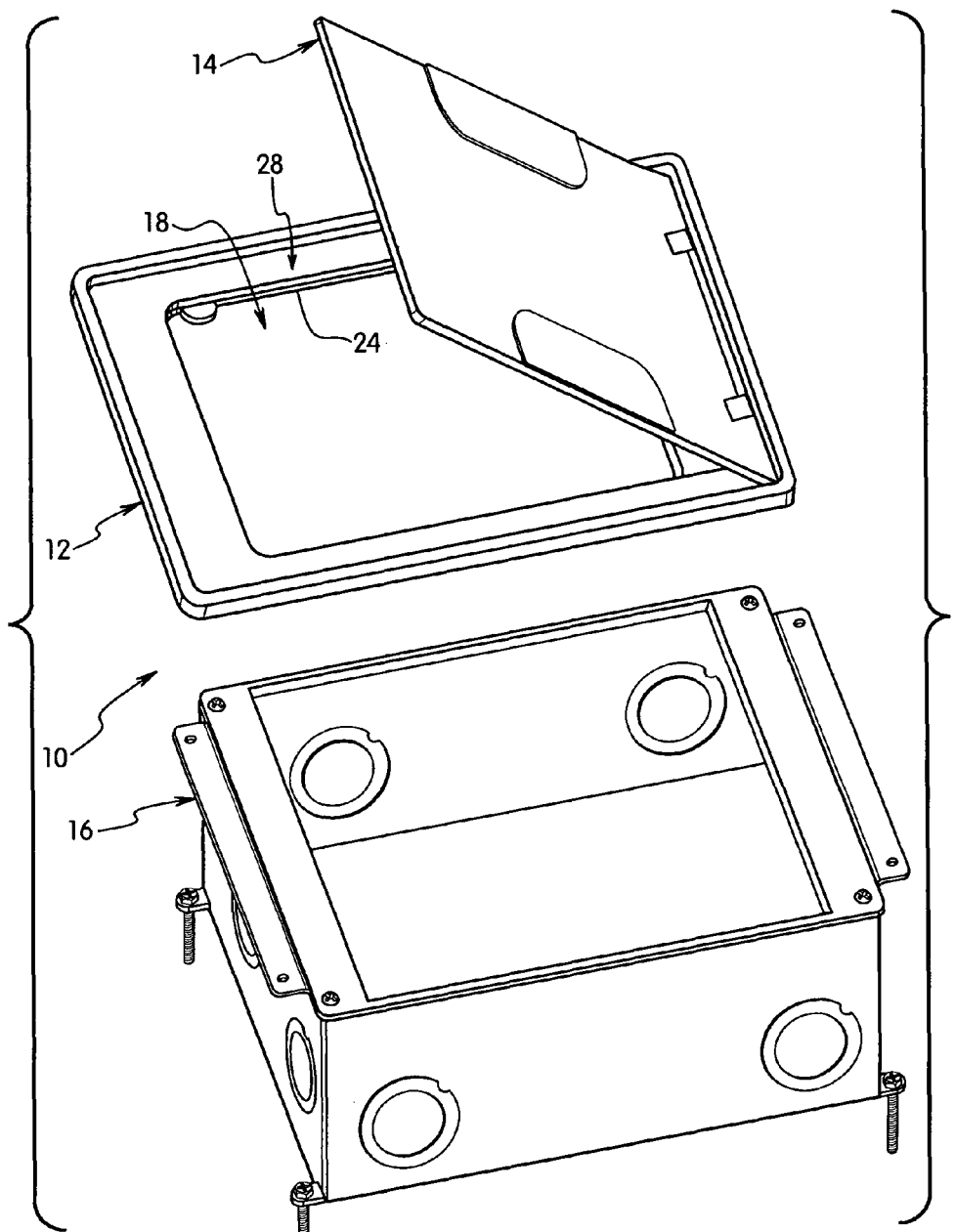
FIG. 1 is an exploded view of the floor box cover assembly in one embodiment of the invention showing the cover in the partially open position.

The present invention is directed to a cover assembly for an electrical box. In particular, the invention is directed to a cover assembly for use with a floor box that is mounted in a floor to allow access to electrical components mounted in the box.

The cover assembly of the invention as shown in the drawings includes a cover assembly 10 having a base 12 and cover 14. The cover assembly 10 is configured to coupling to an electrical box 16. The electrical box 16 in the embodiment shown is a floor mounted box that is intended to be mounted in the floor of a building so that the electrical components are accessible to the user. The electrical box 16 can be any suitable construction as known in the art and is mounted in the floor so that the top edge is substantially flush with the floor surface. In the embodiment shown, the electrical box 16 has an open top end configured for coupling to the cover assembly. The electrical box 16 typically encloses electrical wiring device such as electrical receptacles, video connections and data connections.

Figure 2:
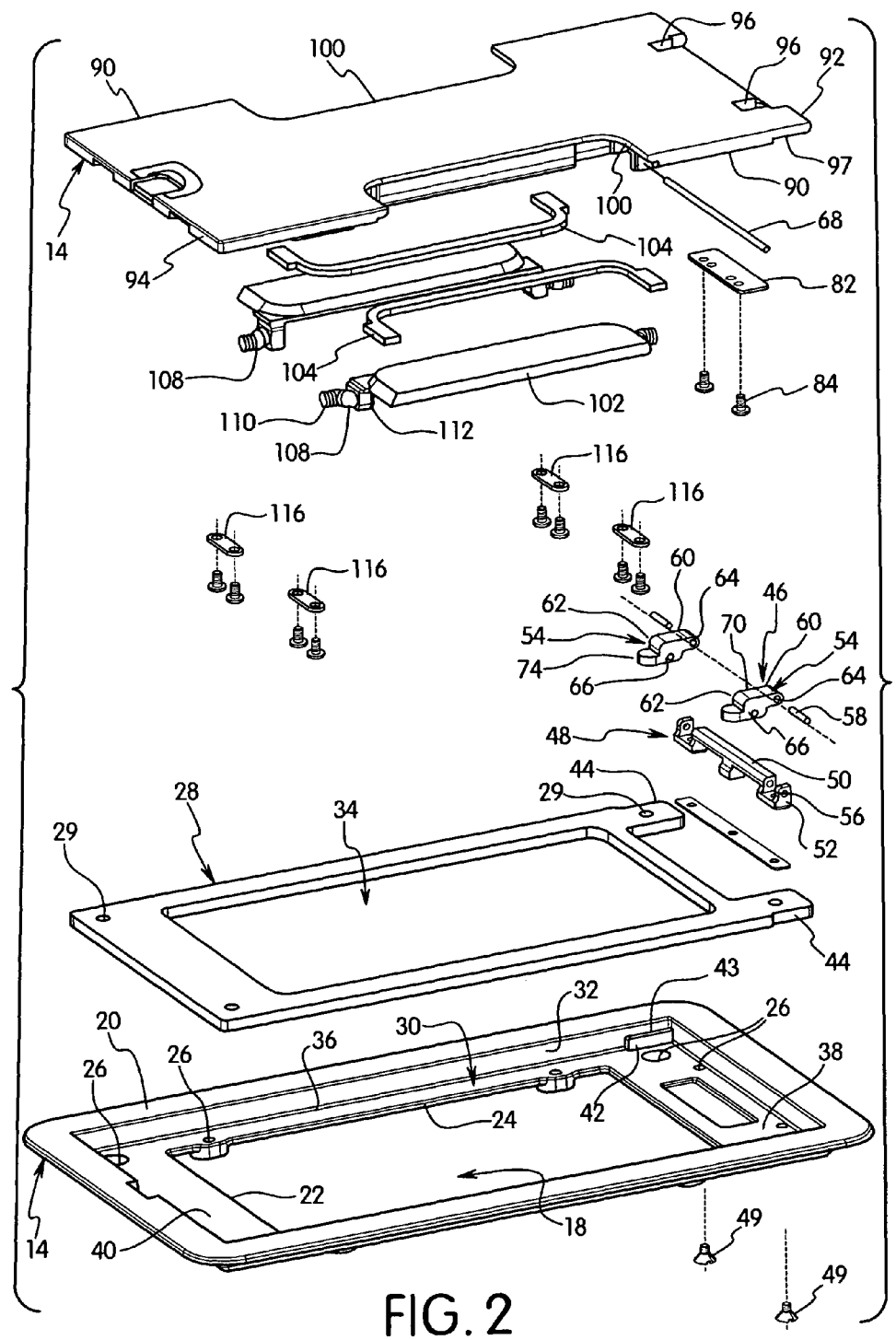
FIG. 2 is an exploded view of the cover assembly in one embodiment of the invention.

Referring to FIG. 2, the base 12 has a substantially rectangular configuration in the embodiment shown although the shape and dimensions of the base can vary depending on the intended use and the dimensions of the electrical box 16. The base has a central opening 18 for allowing access to the electrical components within the electrical box 16. The base 12 has a substantially flat top surface 20 and a recessed area 30 defined by an inwardly extending flange 22. The flange 22 is positioned below and recessed with respect to the top surface 20 of the base 12 to form the recessed area 30 below the top surface 20 of the base 12. A side wall 32 extends between the flange 22 and the top surface 20 of the base 12 to define the depth of the recessed area 30. The inner edge 24 of flange 18 defines the dimensions of the central opening 18. As shown the flange 22 completely surrounds the central opening 18 to form a continuous surface. A plurality of screw apertures 26 are formed in the flange 22 for receiving mounting screws to attach the base to the top end of the electrical box 16.

A gasket 28 is provided in the recessed area 30 on the flange 30 to form a seal between the cover 14 and the base 12 when the cover 14 is closed. The gasket 28 is preferably made from a resilient rubber material that is able form a waterproof or water tight seal between the cover 14 and the base 12 to prevent water and dirt from entering the box 16. As shown in FIG. 2, the gasket 28 has an outer dimension corresponding to the inner dimension of the recessed area 30 of the base 12 so that the gasket 28 fits within the recessed area 30. The gasket 28 is provided with a central opening 34 have a dimension corresponding to the dimension of the central opening 18. Preferably the gasket surrounds the central opening 18 with a continuous surface to provide the water tight seal between the cover 14 and the base 12. The gasket can be attached to the top surface of the flange 22 by an adhesive to prevent separation of the gasket 28 from the cover assembly 10. The gasket 28 preferably has a plurality of holes 29 overlying the screw holes 26 for accessing the mounting screws within the screw holes 26.

The flange 22 of the base 12 has a width to mate with cover 14. The flange 22 is formed with longitudinal side portions 36, a first end portion 38 and a second end portion 40 opposite the first end portion 38. In the embodiment shown in FIG. 2, the flange 22 and side wall 36 of base 12 forming the recessed area 30 include a raised member 42 proximate the first end portion 38. The raised members 42 in the embodiment shown are provided at each corner of the recessed area 30 at the first end portion 38. In one embodiment, the gasket 28 has a thickness corresponding to the height of the raise member 42 so that the top flat face 43 of the raised member 42 is substantially flush with the top surface of the gasket 28. As shown in FIG. 2, the gasket 28 has a notched portion 44 in the two opposite corners to receive the raised members 42. In the embodiment shown in FIG. 2, a raised portion 42 is provided in two corners of the recessed area at the first end portion 38 of the flange 22. Alternatively a raised member can be provided in each of the four corners of the recessed area 30 as shown in FIG. 1.

Figure 3:
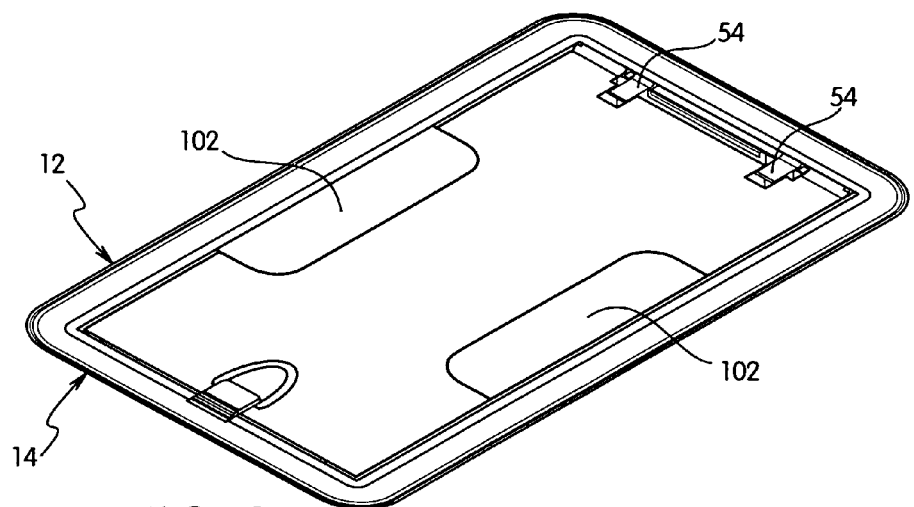
FIG. 3 is a top view of the cover assembly of FIG. 2.

The cover 14 is pivotally coupled to the base 12 by a hinge assembly 46. The hinge assembly 46 is configured to enable the cover 14 to pivot between a closed position shown in FIG. 3 and an open position shown in FIG. 4. Preferably the hinge assembly 46 allows the cover to pivot open so that the cover 14 lays flat on the top surface 20 of the base 12 and the surface of the floor in which the cover assembly and electrical box are mounted. The hinge assembly 46 also enables the cover 14 to pivot to the closed position shown in FIG. 3 where the cover 14 is seated in the recessed area 30 of the base 12 with the top surface of the cover 14 substantially flush with the top surface 20 of the base 12. The hinge assembly 46 provides a full range of pivoting movement of about 180 degrees.

Figure 11:
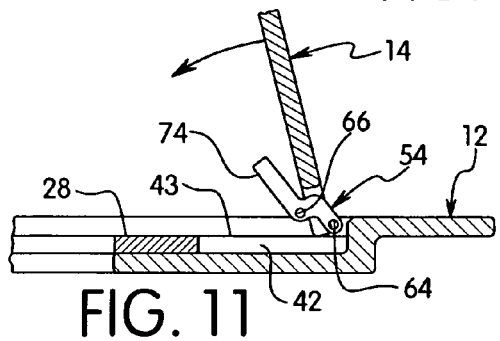
FIG. 11 is a partial cross-sectional side view of the cover of FIG. 10 pivoting to the closed position.

The hinge assembly 46 includes a hinge mounting bracket 48 that is coupled to the first end portion 38 of the flange 22 as shown in the FIG. 2 and FIG. 11. The hinge mounting bracket 48 is attached to the flange 22 by screws 49, rivets or other suitable fasteners. The mounting bracket 48 in the embodiment shown has a body portion 50 with a U-shaped member 52 at each end for pivotally coupling to a hinge body 54. As shown in FIG. 11 the body 50 of the hinge mounting bracket 48 is spaced from the flange 22 and has a top end substantially flush with the top surface of the base 12. Each U-shaped member 52 has a bore 56 for receiving a pivot pin 58. In one preferred embodiment two U-shaped members 52 are provided for supporting two hinge bodies 54 for supporting the cover 14.

Figure 5:
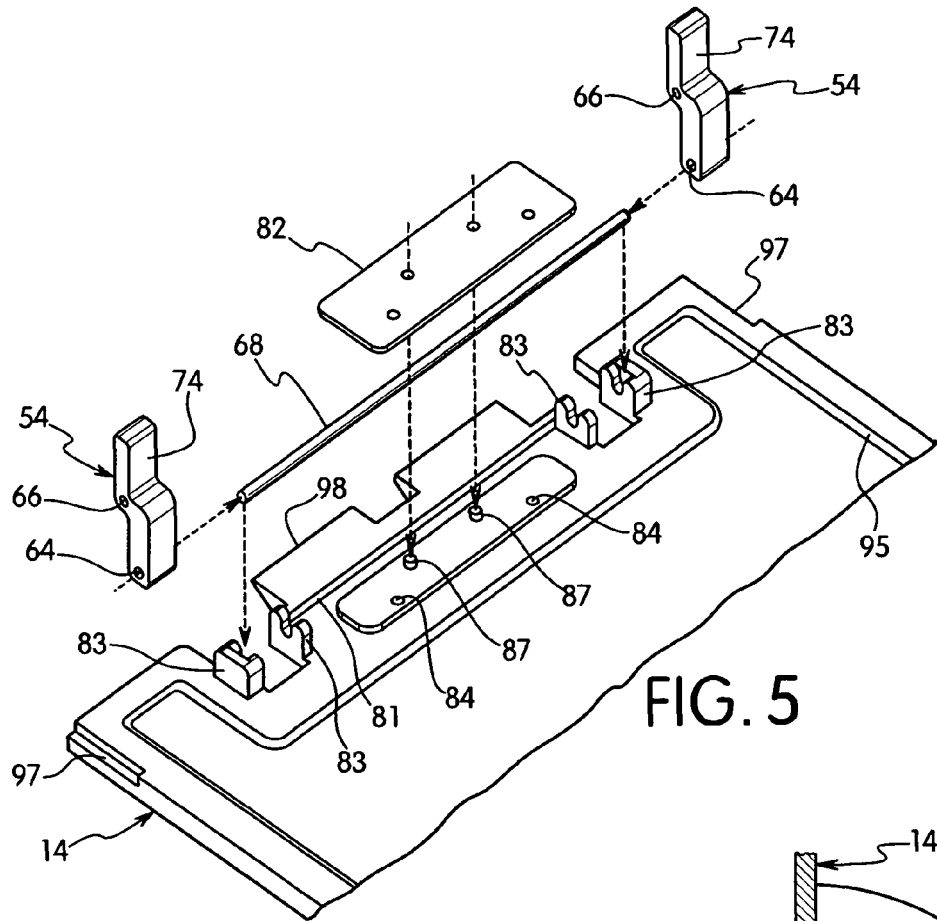
FIG. 5 is a partial exploded view of the hinge assembly.
Figure 6:
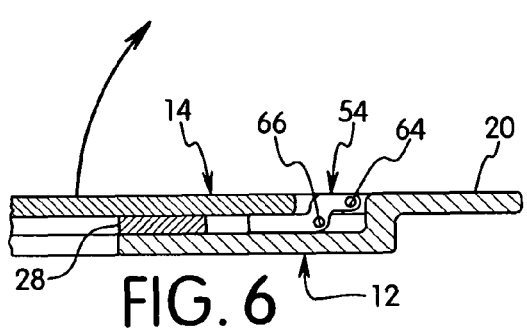
FIG. 6 is a partial cross-sectional side view of the hinge assembly showing the cover in the closed position.

Each hinge body 54 is configured for pivotally coupling the cover 14 to the base 12 and allowing a full range of pivoting motion between the cover 14 and the base 12. The hinge body 54 has a longitudinal dimension with a first end 60 and a second end 62. The first end 60 of the hinge body 54 has bore 64 for receiving the pivot pin 58 and pivotally coupling the hinge body 54 to the bracket 48 and the base 12. The bore 64 and pivot pin 58 define a first pivot axis of the hinge body 54 with respect to the base 12. The hinge body 58 is able to pivot with respect to the bracket 48 and the base 12 between a first position overlying the flange 22 and extending in a direction substantially parallel to the flange 22 with the cover 14 in the closed position as shown in FIG. 5 and a position extending in an upward direction substantially perpendicular to the flange 22 with the cover 14 in the open position as shown in FIG. 6.

The second end 62 of the hinge body 54 has a bore 66 for receiving a pivot pin 68 for pivotally coupling the cover 14 to the hinge body 54. The bore 66 and pin 68 define a second pivot axis of the hinge body 54 spaced from the first pivot axis in a longitudinal direction with respect to the longitudinal dimension of the hinge body 54. In the embodiment shown, the bore 66 lies in a plane that is offset from the plane of the bore 64. In this manner the bores 64 and 66 define two pivot axes that are space apart along the longitudinal dimension of the hinge body 54 and spaced apart in a generally transverse direction of the hinge body 54 so that the bore 64 is spaced adjacent a first side 70 of the hinge body 54 and the bore 66 is adjacent a second side 72 of the hinge body 54.

As shown in FIG. 2 and FIGS. 5-11, the hinge body 54 has a tab 74 extending from the second end 62 in a substantially longitudinal direction. In the embodiment shown, the tab 74 is aligned with the second bore 66 and is offset from a center longitudinal axis of the hinge body 54. The cover 14 has a first end 92 with two slots or recessed portions 76 for receiving the respective hinge body 54. A hinge pin 68 is recessed in groove 81 extending between hinge lugs 83 and is coupled to the bottom side of the cover 14 by a mounting plate 82 that is attached to the bottom side of the cover 14 by rivets 84, screws or other fasteners. Bosses 87 extend upward from the inner face of the cover 14 to align the plate during assembly. The hinge pin 68 is aligned with the recessed portions 78 and extends through the bores 66 of the hinge body 54 to pivotally couple the hinge body 54 to the cover 14.

The hinge body 54 enables the cover 14 to pivot freely between the open position and the closed position to lay flat against the top surface of the base 12 and the floor surface. Referring to FIG. 6, the cover 14 seats on the gasket 28 and the hinge body 54 lies against the surface of the flange 22 in the closed position. The hinge body 54 preferably has a dimension so that the side edge 70 is substantially flush with the top surface of the cover 14 and the base 12. The cover 14 pivots toward the open position shown in FIG. 6 about the first pivot axis so that the hinge body 54 pivots upwardly until the hinge body makes contact the top edge of the recessed area 30. The cover 14 continues to pivot to the open position shown in FIG. 7 about the second pivot axis to lay flat on the top surface of the base 12 and the floor surface.

Figure 7:
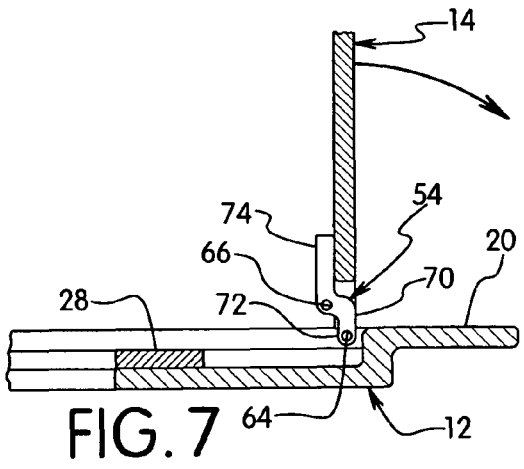
FIG. 7 is a partial cross-sectional side view of the hinge assembly showing the cover partially open.
Figure 8:
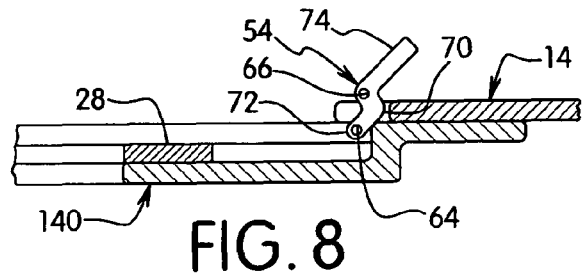
FIG. 8 is a partial cross-sectional side view of the hinge assembly showing the cover in the open position and laying flat against the top surface of the base.
Figure 10:
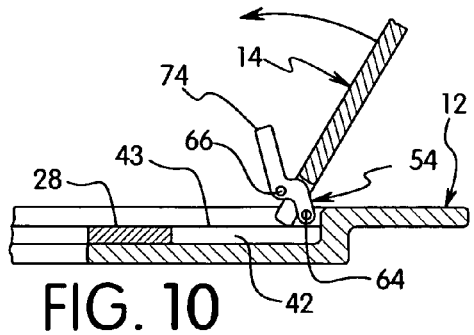
FIG. 10 a partial cross-sectional side view of the hinge assembly of FIG. 9 showing the cover pivoting toward the closed position.

To close the cover 14 the cover is pivoted from the position shown in FIG. 7 toward the position shown in FIG. 8. In the first portion of the pivotal movement, the cover 12 pivots about the first pivot axis defined by the pivot pin 58 in the bore 64 at the first end of the hinge body 54 until the bottom face of the cover 14 contacts the tab 74 as shown in FIG. 10. The contact of the bottom face of the cover 14 with the tab 74 causes the hinge body 54 to continue pivoting simultaneously with the cover 12 to the closed position shown in FIG. 6. The tab 74 limits the pivoting movement between the hinge body 54 and the cover 14 so that the hinge body 54 pivots to the closed position by pivoting about the first pivot axis of the pin 58. The tab 74 prevents the first end of the cover 14 from lifting upward from base when the second end of the cover is latched to the base. As shown in FIG. 6, the tab 74 prevents the hinge body 54 from pivoting about the first pivot axis without pivoting the cover open.

Figure 9:
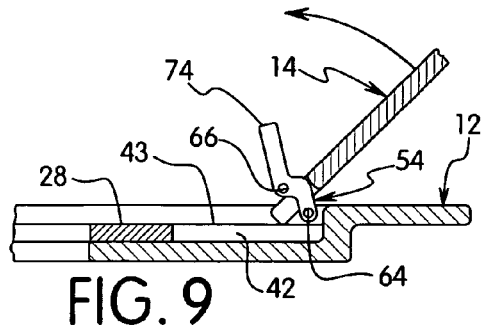
FIG. 9 is a partial cross-sectional side view of the hinge assembly showing the cover being pivoted from the open position to the closed to the open position and showing the cover sliding on the slide surface.

The end of the cover 14 engages the slide surface 43 of the raised member 42 during opening and closing of the cover 14 as depicted in FIGS. 9-11. The top slide surface 43 of the raised member 42 forms a bearing surface for the edge of the cover 14 as shown in FIG. 8. The raised members 42 are positioned on opposite corners of the recessed area forming a bearing or wear resistance surface to contact the edge of the cover 14 during the pivoting movement of the cover 14 with respect to the base 12. The raised members 42 prevent the edges of the cover 14 from sliding over the surface of the gasket 28 during opening and closing of the cover 14 to prevent excessive wear to the soft and resilient gasket material.

Figure 4:
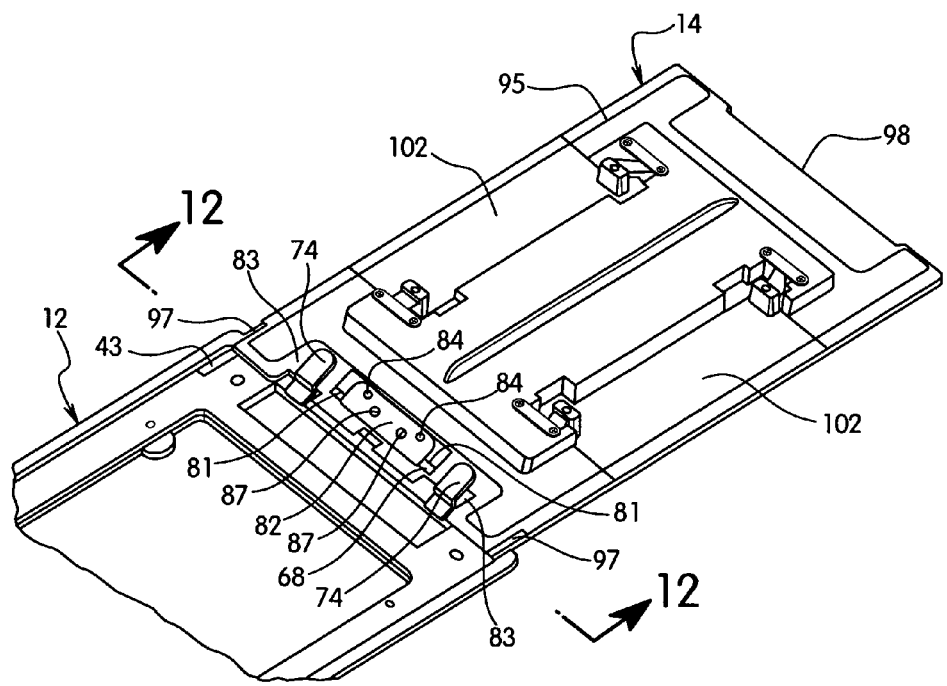
FIG. 4 is partial top perspective view of the cover assembly of FIG. 3 showing the cover in the open position.

The cover 14 as shown in FIG. 2 has a shape and dimension to be received within the recessed area 30 of the base 12. The cover 14 has longitudinal side edges 90, a first hinge end 92, and a second front end 94. A continuous rib 95 extends from the bottom surface of the cover 14 to surround the opening in the base 12 and form a seal against the gasket 28. The rib 95 has a height to extend below the top face of the raised members 42 to ensure contact with the gasket 28 and form a watertight seal. As shown in FIGS. 4 and 5, each of the corners at the hinge end of the cover 14 have a recess 97 with a dimension to receive the top surface of the raised members 42 to enable sealing by the gasket at the corners of the cover 14.

Figure 12:
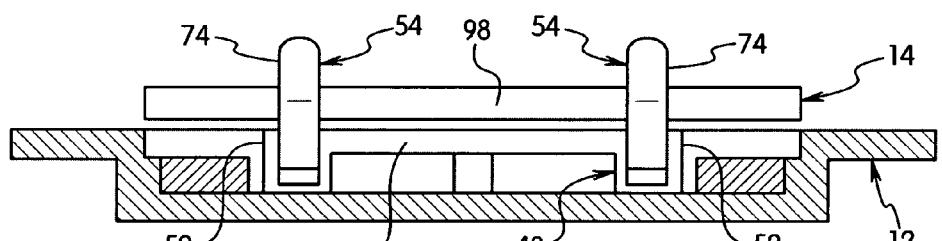
FIG. 12 is cross-sectional view of the base, hinge assembly and cover in the open position taken along line 12-12 of FIG. 4.
Figure 13:
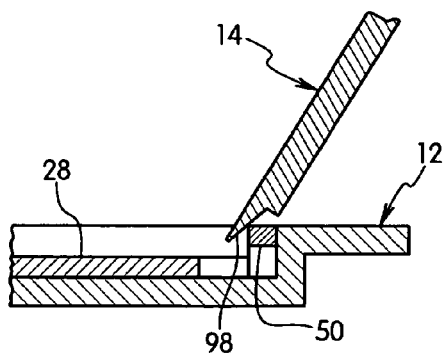
FIG. 13 is a cross-sectional view of the cover engaging the hinge bracket while closing the cover.
Figure 14:
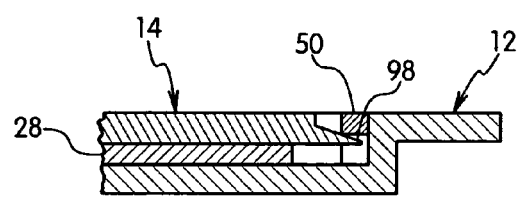
FIG. 14 is a cross-sectional view of the cover in the closed position.

The hinge end 92 has a pair of slots 96 for receiving the hinge body 54. As shown in FIGS. 12-14 the center portion of the hinge end 92 between the slots 96 has an inclined face 98 that slopes from the top face toward the bottom face of the cover 14. The inclined face 98 forms a flange that engages the body portion 50 forming a cross member of the hinge bracket 48 during the closing moving of the cover 14 with respect to the base 12 and slides over the surface of the cross member. The inclined face 98 contacts the body portion 50 and slides around and under the body portion 50 during the closing motion of the cover 14 so that the inclined face extends under the body portion 50 when the cover is fully closed as shown in FIGS. 13 and 14.

Figure 15:
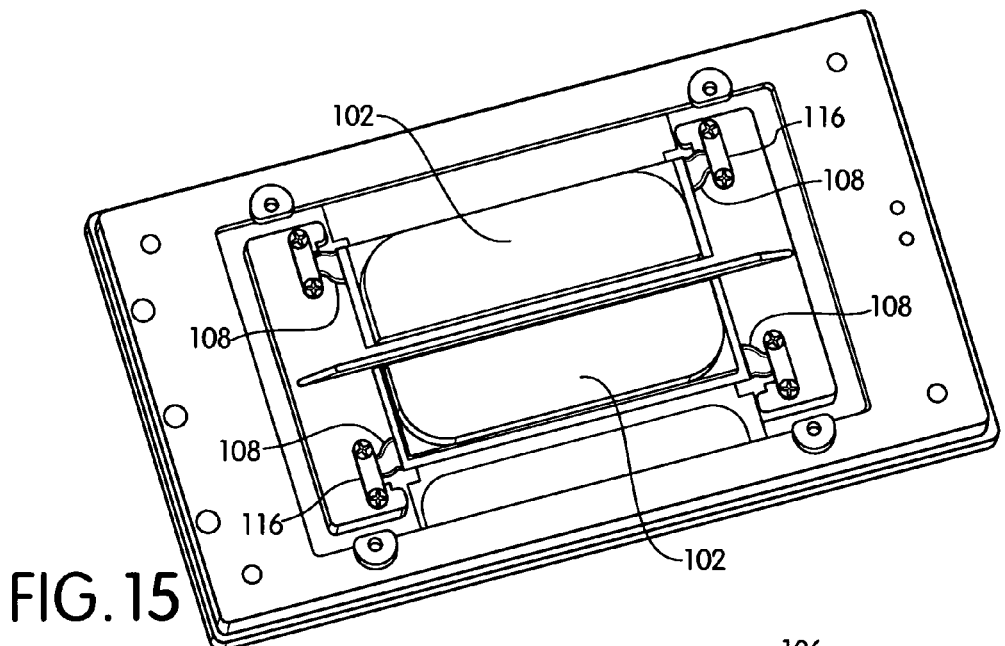
FIG. 15 is a bottom view of the cover assembly showing the access doors of the cover in the open position.
Figure 16:
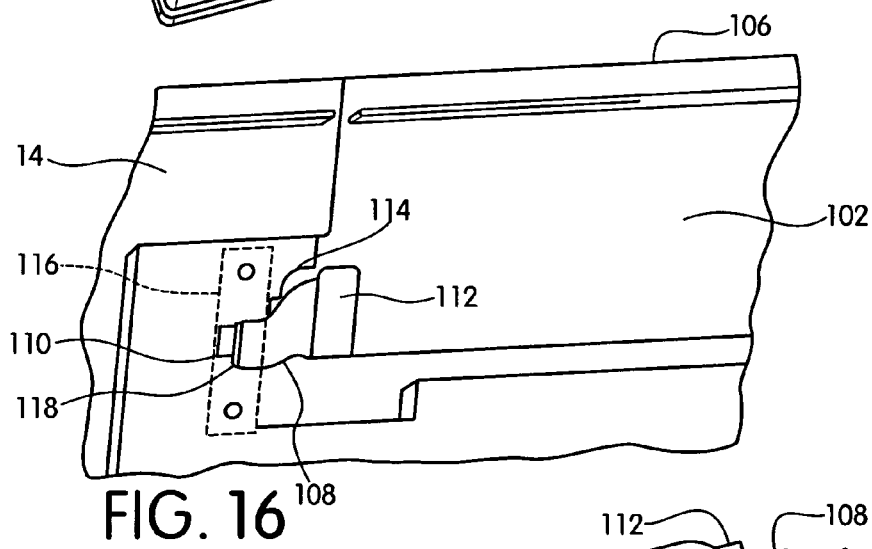
FIG. 16 is a partial bottom view of the hinge of the access doors with the retainer removed showing the hinge assembly and compression spring.
Figure 17:
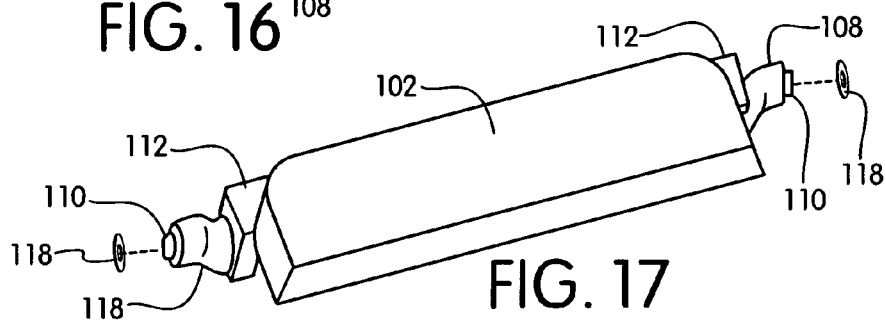
FIG. 17 is an exploded view of the access door with the compression spring washer.
Figure 18:
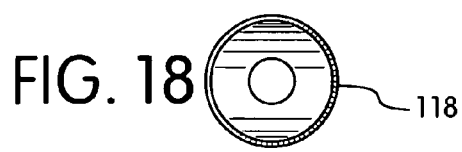
FIG. 18 is top view of the compress spring washer of FIG. 14.
Figure 19:
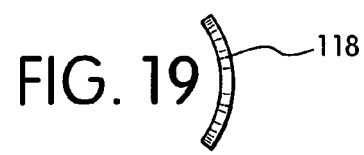
FIG. 19 is a side view of the compression spring washer of FIG. 15.
Figure 20:
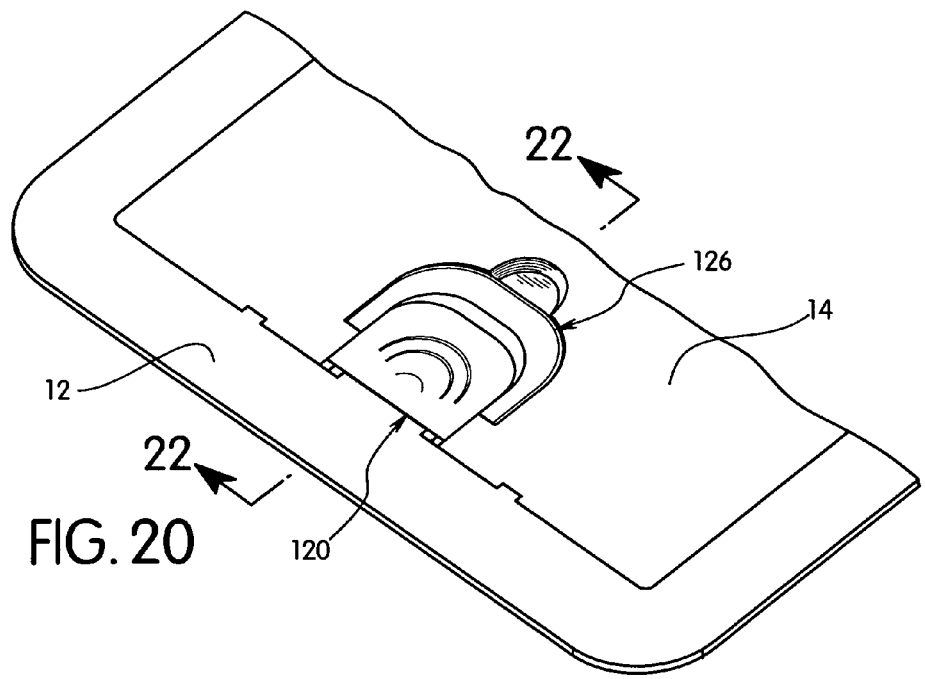
FIG. 20 is a partial top view of the cover showing the latch assembly in one embodiment of the invention.
Figure 21:
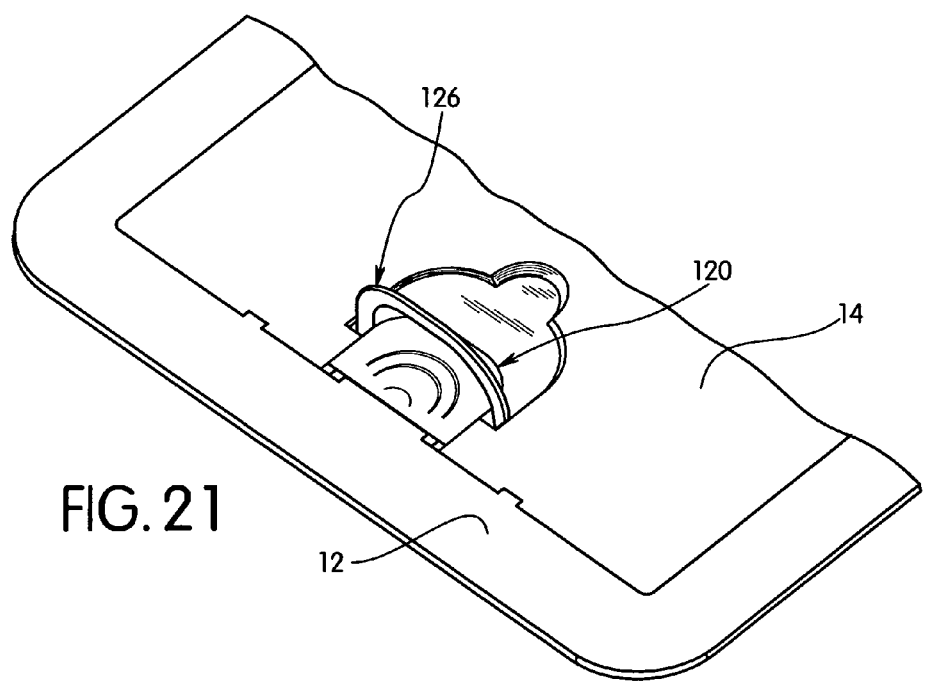
FIG. 21 is a top view of the latch assembly showing the actuator member in the open position.

The side edges 90 of the cover 14 each include an access opening 100 and a movable access door 102 to allow electrical cords to pass through when the cover 14 is closed. Each access door 102 has an inner edge with a gasket 104 and an outer edge 106 for mating with the recessed area 30 and the gasket 28 on the base 12. As shown in FIGS. 15-17, the access doors 102 each have two hinge pins 108 extending from opposite ends for pivotally coupling with the cover 14. The hinge pins 108 in the embodiment shown have a bent configuration so that the bearing 110 of the hinge pins are offset from the base 112 of the hinge pins 108. The bearings 110 of the hinge pins 108 are received in a complementing recess 114 in the cover 14 and held in place by a plate member 116. The resistance to the movement of the doors 102 is provided by an axial compression member such as a friction washer, rubber O-ring, spring washer or the like. As shown in FIGS. 16 and 17 a compression spring washer 118 is positioned between the recess 114 and the face of the bearing end 110 to provide a frictional force to the access doors 102 to retain the access doors in place while allowing the user to open and close the access doors as needed. As shown in FIGS. 17 and 18 the compression spring washer 118 has a generally round perimeter and a first curved concave face and an opposite convex face that is compressed when inserted into the recess 114 to apply an axial compression or force from opposite ends of the access door 102.

The front end 94 of the cover 14 has a sliding latch assembly 120 that is able to latch the cover 14 in the closed position. The latch assembly 120 includes a main latch body 122 that slides within an opening 124 in the end of the cover so that the body 122 slides between a latched position and an unlatched position. A handle 126 is provided for actuating the sliding body 122.

Referring to FIGS. 22-25, the body 122 has a front end 128 with a latch member 130 having a lower inclined face 132 to assist in closing the cover 14. A corresponding slot is provided in the end wall of the base 12 to receive the latch member 130. In the embodiment shown, the sides of the body 122 have a slot 134 that mate with a corresponding rib 136 extending inwardly from the sides of the opening 124 to allow the body 122 to slide in a linear direction with respect the plane of the cover 14.

Figure 22:
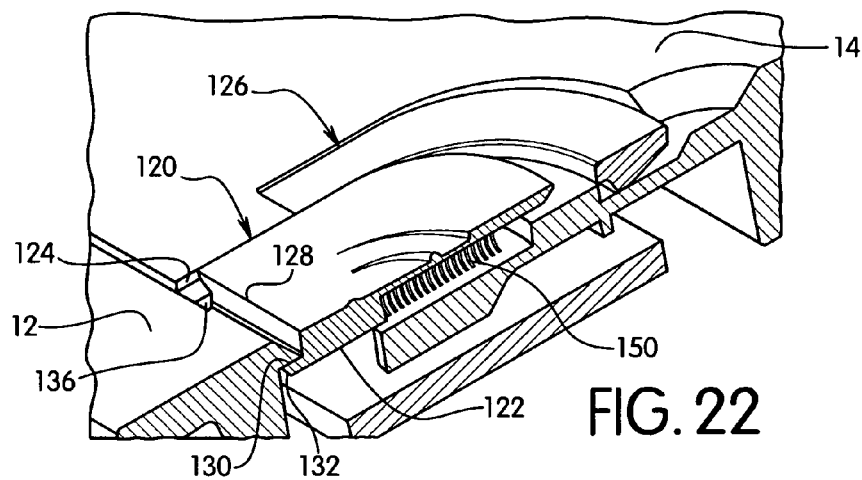
FIG. 22 is a cross-sectional view of the latch assembly taken along line 22-22 of FIG. 20.
Figure 23:
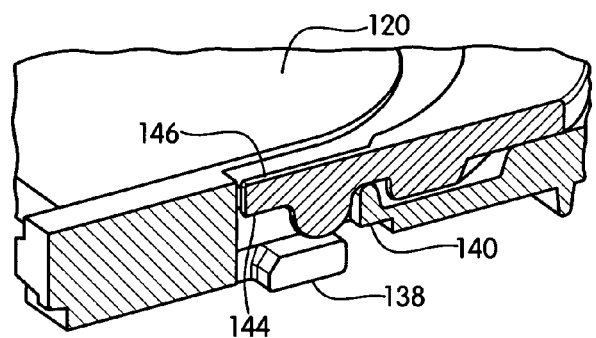
FIG. 23 is a cross-sectional view of the latch assembly showing the arm extending from the slide latch and the detents of the actuator member for actuating the slide latch.
Figure 24:
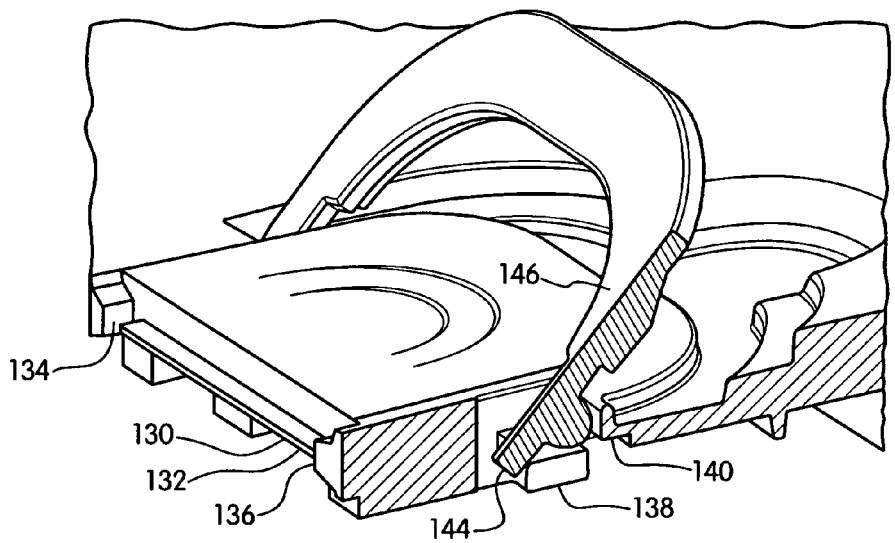
FIG. 24 is a cross-sectional view of the latch assembly showing the actuating members sliding the slide latch toward the unlatched position.
Figure 25:
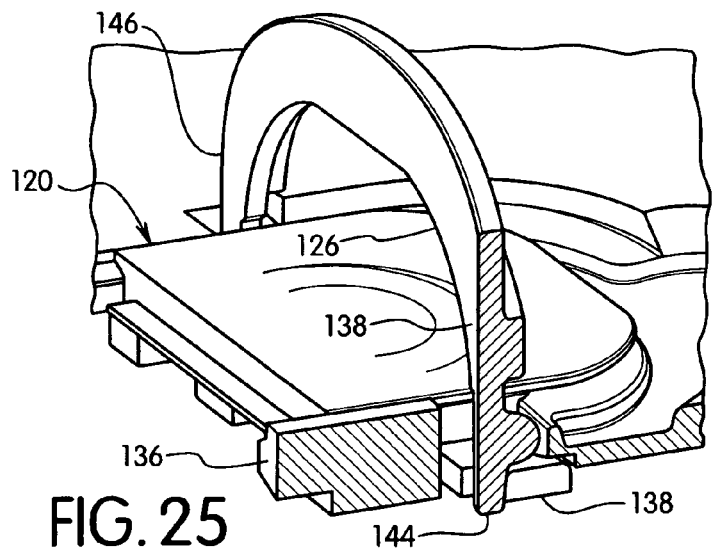
FIG. 25 is a cross-sectional view of the latch assembly showing the slide latch in the unlatched position.
Figure 26:
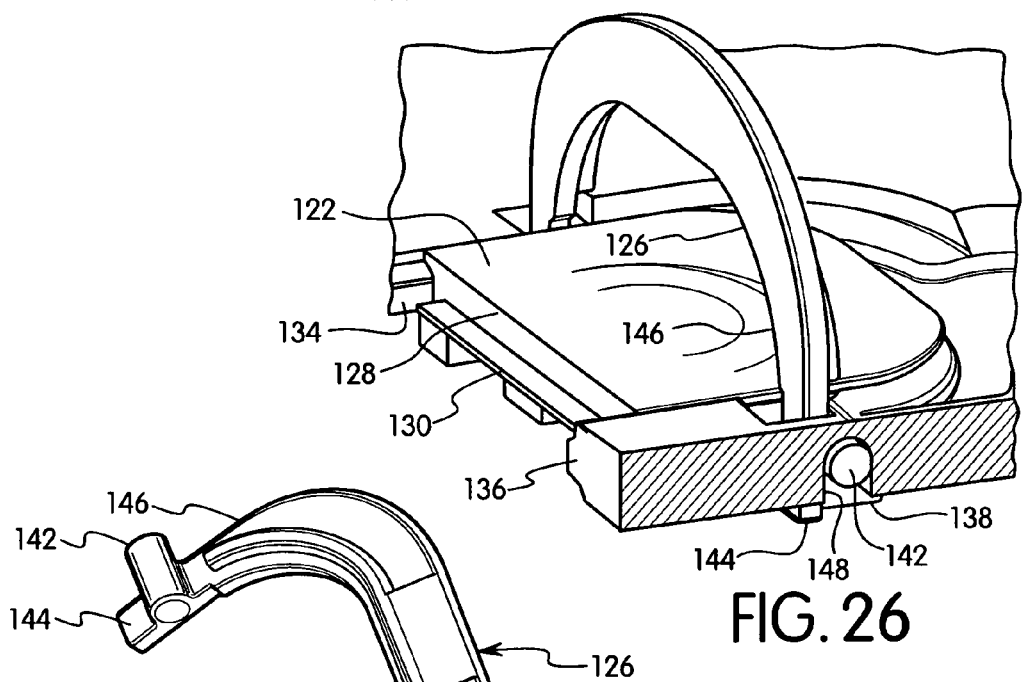
FIG. 26 is a cross-sectional view showing the slide latch in the open position.
Figure 27:
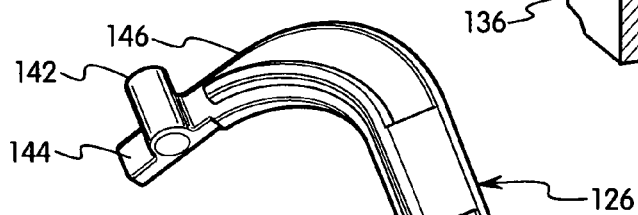
FIG. 27 is a perspective view of the actuating member of the latch assembly.

Each side of the body has an outwardly extending arm 138 that slides in an open area 140 in the cover 14 adjacent the opening 124. The handle 126 as shown in FIGS. 23 and 24 has a substantially U-shaped configuration with a pair of legs 146 where each leg has an outwardly extending pivot pin 142 that is received in a corresponding hole 148 in the cover 14 to allow pivoting movement of the handle 126 with respect to the cover 14 and the body 122. The legs 146 of the handle 126 have a detent 144 extending in a linear direction and perpendicular to the axis of the pivot pins 142 that engage the arms 138 on each side of the body 122. As shown in FIGS. 21-27, the pivoting motion of the handle 126 causes the detents 144 to engage the arms 138 to retract the body 122 to the unlatched position. As shown in FIG. 22 a spring member 150 is included between the body 122 and the cover 14 to bias the body 122 to the closed position.

While various embodiments have been chosen to illustrate the invention, it will be understood by those skilled in the art that various changes and modifications can be made without departing from the scope of the invention and defined in the appended claims.

What is claimed is:

1. A cover assembly for a floor box comprising:
a base defining a central opening for accessing the floor box;
a cover having a dimension to close said central opening, said cover having an outer face and an inner face opposite said outer face, said inner face facing inwardly with respect to a cavity of said floor box; and
a hinge having a hinge body with a longitudinal dimension, a first longitudinal end pivotally coupled to said base at a first pivot axis and a second longitudinal end pivotally coupled to said cover at a second pivot axis, said second longitudinal end of said hinge body having a tab extending longitudinally from said second longitudinal end to contact said inner face of said cover to limit pivoting of said cover with respect to said second pivot axis of said hinge body.

2. The cover assembly of claim 1, wherein
said cover is pivotable between a first closed position and a second open position substantially 180° from said closed position.

3. The cover assembly of claim 2, wherein
said base has a top face, said top face of said cover aligned with and coplanar with said top face of said base when said cover is in the closed position, and
said top face of said cover lying flat against said top face of said base when said cover is in an open position.

4. The cover assembly of claim 3, wherein
said first longitudinal end of said hinge body is pivotally connected to said base at a pivot axis positioned below said top face of said base, and where said second longitudinal end of said hinge body is positionable with respect to said base between a first position below said top face of said base and a second position above said top face of said base.

5. The cover assembly of claim 1, wherein
said hinge body has a transverse dimension and where said first pivot axis is spaced apart from said second pivot axis along said longitudinal dimension and along said transverse dimension of said hinge body.

6. The cover assembly of claim 5, wherein
said tab on said hinge body extends in said longitudinal dimension of said hinge body in a longitudinal plane spaced from a longitudinal plane of said first pivot axis.

7. The cover assembly of claim 1, wherein said base further comprises
a recess defining said opening, said recess having a ledge, a gasket support on said ledge for forming a seal between said base and cover, and said base having a raised surface spaced from said ledge and positioned next to a top face of said gasket, said raised surface configured for contacting said cover during opening and closing of said cover with respect to said base.

8. The cover assembly of claim 7, wherein
said hinge body is coupled to a first end of said base and to a first end of said cover, said raised surface being positioned at said first end of said base to contact an edge of said cover during opening and closing of said cover, and where said edge of said cover slides on said raised surface to minimize sliding contact of said edge of said cover on said gasket.

9. The cover assembly of claim 1, wherein
said cover has a first end pivotally coupled to said hinge body and second end having a latch assembly, said latch assembly comprising:
a slide latch coupled to said cover for sliding in a plane of said cover between a retracted position and an extended latching position,
an actuating member pivotally coupled to said cover, said actuating member having a pivot axis parallel to said plane of said cover and a first detent engaging a first side of said slide latch and a second detent engaging a second side of said slide latch, whereby pivoting said actuating member causes sliding movement of said slide latch.

10. The cover assembly of claim 9, wherein
said slide latch has a first arm extending outwardly from a first side of said slide latch engaging said first detent and a second arm extending outwardly from a second side of said slide latch, and where said detents of said actuating member engages said arms to pivot said slide latch by pivoting of said actuating member.

11. The cover assembly of claim 1, said cover further comprising
a cord access opening, and
an access door pivotally coupled to said cover to close said cord access opening, said access door having two opposing pivot pins pivotally coupled to said cover to pivot said access door between a closed position to close said egress door and an open position, a compression spring washer on at least one said pivot pin and positioned between said cover and said access door to apply an axial force against said access door to retain said access door in said open position and said closed position.

12. The cover assembly of claim 1, wherein
said hinge body has a top face and a bottom face extending in said longitudinal dimension between said first longitudinal end and said second longitudinal end, and where said tab extends along said bottom face of said hinge body in said longitudinal dimension.

13. The cover assembly of claim 12, wherein
said first pivot axis of said hinge body is oriented in a first plane extending in said longitudinal dimension, and
said second pivot axis of said hinge body is oriented in a second plane extending in said longitudinal dimension and spaced from said first plane.

14. A cover assembly for a floor box, comprising
a base defining a central opening for accessing said floor box, said base having a first end and second end, a flange extending into said central opening and spaced from a top face of said base to define a recess, and a first raised member at said first end and extending upwardly from said flange, said raised member having a top face defining at least one slide surface in said opening at said first end;
a gasket on said flange and surrounding said central opening;
a cover having a dimension to close said central opening and contacting said top surface of said raised member during opening and closing of said cover with respect to said base; and
a hinge having a hinge body with a first end pivotally coupled to said base at a first pivot axis, and a second end pivotally coupled to said cover at a second pivot axis.

15. The cover assembly of claim 14, wherein
said raised member is provided on said flange extending into said central opening and spaced from a top face to define a recess, and
said raised member extends upwardly from said flange to define said slide surface spaced from a top face of said flange and said raised member being positioned next to said gasket.

16. The cover assembly of claim 14, wherein
said top surface of said raised member is substantially flush with a top surface of said gasket.

17. The cover assembly of claim 16, wherein
said base has a first end coupled to said hinge body, and said first raised member is positioned at said first end of said base to contact a first end of said cover during opening and closing of said cover.

18. The cover assembly of claim 17, wherein
said base has a first side and second side extending between said first end and second end of said base, said first raised member positioned on said first side of said base at said first end and a second raised member on said second side at said first end of said base, and
said cover having a first edge at a first end of said cover to slide on said first and second raised members during opening and closing of said cover, and where said first and second raised members are oriented outwardly from said gasket.

19. A cover assembly for a floor box, comprising:
a base defining a central opening for accessing said floor box, said base having a flange spaced from a top face of said base and extending into said central opening;
a cover having a dimension to close said central opening and to mate with said flange;
a sliding latch member coupled to said cover for sliding movement between a latched position and an unlatched position, said latch member having a first arm extending from a first side and second arm extending from a second side; and
an actuating member pivotally coupled to said cover about a pivot axis parallel to a plane of said cover, said actuating member having a first detent engaging said first arm and a second detent engaging said second arm, whereby pivoting said actuating member produces a sliding movement of said sliding latch; and
a hinge having a hinge body coupled to said cover and said base to pivot said cover between an open position where said cover is substantially parallel to said base and a closed position where said cover is received in said central opening.

20. The cover assembly of claim 19, wherein
said flange has a first raised member on a first side at a first end of said base and a second raised member on a second side at said first end of said base, said first and second raised members defining first and second slide surfaces for contacting a first end of said cover during opening and closing of said cover.

21. The cover assembly of claim 20, wherein
said hinge body is coupled to said first end of said cover and said first end of said base.

22. The cover assembly of claim 21, wherein
said hinge body has a first end pivotally coupled to said first end of said base and a second end pivotally coupled to said first end of said cover.

23. The cover assembly of claim 22, wherein
said hinge body has a tab extending longitudinally from said second end of said hinge body and positioned to contact a bottom face of said cover to limit pivotable movement of said cover with respect to said hinge body.

\* \* \* \* \*